United States Patent [19]

Harris, Jr. et al.

[11] Patent Number: 4,687,673
[45] Date of Patent: Aug. 18, 1987

[54] SWEET GOODS DOUGH FORMING PROCESSES

[75] Inventors: Meade C. Harris, Jr., Rutherford; David W. Miller, Ridgewood; Henry E. Arciszewski, Franklin Lakes, all of N.J.

[73] Assignee: Nabisco Brands, Inc., Parsippany, N.J.

[21] Appl. No.: 910,293

[22] Filed: Sep. 17, 1986

Related U.S. Application Data

[63] Continuation of Ser. No. 199,448, Oct. 22, 1980, which is a continuation of Ser. No. 641,676, Dec. 17, 1975, abandoned.

[51] Int. Cl.$^4$ .................... A21D 2/00; A21D 10/00; A23L 1/30
[52] U.S. Cl. .................... 426/549; 426/553; 426/656; 426/657
[58] Field of Search ............ 426/549, 552, 553, 656, 426/657, 23, 496

[56] References Cited

U.S. PATENT DOCUMENTS

| | | | |
|---|---|---|---|
| 2,301,745 | 11/1942 | Otterbacher | 426/549 |
| 2,627,465 | 2/1953 | Pettibone | 426/549 X |
| 3,006,765 | 10/1961 | Ferrari | 426/23 |
| 3,149,979 | 9/1964 | Bohn | 426/553 |
| 3,185,574 | 5/1965 | Gabby et al. | 426/549 |
| 3,792,176 | 2/1974 | Patten et al. | 426/556 |

OTHER PUBLICATIONS

Smith, "Biscuits, Crackers & Cookies," Science Publishers Ltd., London, vol. 1, pp. 33-45, 91, 84-85, 207-208, 528-530, 562-563 (1972).
Smith, "Biscuits, Crackers & Cookies," Science Publishers Ltd., London, vol. 2, p. 96 (1972).

*Primary Examiner*—Steve Alvo
*Attorney, Agent, or Firm*—Richard Kornutik

[57] ABSTRACT

A process for forming sweet goods doughs for producing nonperishable sweet goods such as cookies and graham crackers. The water and the water soluble ingredients of the dough, including sugars and sweeteners, are mixed to substantially saturate the water. The insoluble ingredients (which includes flour and emulsified shortening) and any high protein ingredients together with leavening and flavors, are then combined with the premixed sugars and water and mixed until uniform distribution of the ingredients through the dough is just achieved. The dough is formed into pieces in as short a period of time as practical, and the pieces are baked. Protein fortified baked sweet goods containing up to 33 percent by weight protein and having a tender open structure are produced from doughs having a moisture content of only between 6% and 14% by weight.

15 Claims, No Drawings

SWEET GOODS DOUGH FORMING PROCESSES

This application is a continuation of application Ser. No. 199,448, filed Oct. 22, 1980, which in turn is a continuation application of Ser. No. 641,676 filed Dec. 17, 1975, now abandoned.

BACKGROUND OF THE INVENTION

This invention is related to baked sweet goods and to process for preparing dough for baked nonperishable sweet goods.

In order to combat the world feeding problem, and particularly the problem of protein deficient diets, considerable attention has been given to the fortifying of foods with high protein ingredients.

In baked nonperishable sweet goods, the incorporation of high protein ingredients generally increases the energy required to bake the products. Many high protein ingredients suitable for incorporation in baked goods imbibe and tightly hold large amounts of water. Extra water must therefore be added to doughs containing such ingredients to produce a dough consistency which can be handled and formed into product pieces by conventional bakery machinery. Extra energy is required to bake out the excess water and to drive the imbibed water out of the high protein ingredients. Reduction of the water content of the finished product is required to prevent spoilage.

Nonperishable sweet goods are normally prepared by mixing together the sugar, shortening and water of the formulation to form a cream mass and then mixing in the flour and any other protein ingredients together with minor ingredients such as leavening, flavors, etc. When this conventional mixing method is used, the addition of high protein ingredients not only requires the use of increased water as discussed above but also results in a finished product which has an undesirable dense structure which tends to be hard.

The process of the present invention overcomes the poor eating quality and high water requirement associated with high protein formulations in the past. In addition, when this process is employed with conventional formulations, less water is required in the formulation, and the resulting product has a novel open texture and a sensation of increased sweetness.

SUMMARY OF THE INVENTIION

An object of this invention is to provide improved baked goods products of low moisture, such as cookies and crackers. Another object of this invention is to provide baked nonperishable sweet goods having a texture related to a sugar structure which imparts a unique, somewhat crystalline, open characteristic, which readily dissolves in the mouth and which contributes to an increased sensation of sweetness. A further object of this invention is to provide a means for increasing the sensation of sweetness without increasing the level of sweeteners. Another object of this invention is to provide a mixing procedure which is materially shorter than conventional mixing procedures, thereby reducing the energy requirement per given unit of mixed dough and increasing the output of a given mixer per unit time. A further object of this invention is to provide a novel process which produces a unique change in the texture of nonperishable sweet baked products, with an associated unexpected increase in the organoleptic sensation of sweetness in normal level protein products. Another object of this invention is to provide a novel mixing process for incorporating high protein ingredients into nonperishable sweet goods formulations having conventional water levels. A still further object of this invention is to provide high-protein sweet goods which are not only palatable but also possess qualities which are quite closely associated with conventional desirable high quality baked goods of low protein content.

A further object of this invention is to provide a reduction in the level of absorption water required to size a nonperishable sweet goods dough for proper machining. Another object of this invention is to provide a means for reducing the bake time, bake temperature or both of baked goods in general and high-protein nonperishable sweet goods in particular with a corresponding energy savings and gains in production efficiencies over conventional methods for preparing the same protein level nonperishable baked goods. Another objective of this invention is to provide a means for controlling water absorption of substantially insoluble but hygroscopic materials in systems that contain water soluble materials.

Other objects and advantages of this invention are set out elsewhere herein or are obvious to those ordinarily skilled in the art from this disclosure.

The foregoing objects are accomplished in accordance with the present invention by providing a mixing procedure for nonperishable sweet goods which favors the development of a sugar structure and minimizes the quantity of water adsorbed or absorbed by protein ingredients, and by using both conventional and high protein nonperishable sweet goods doughs prepared by this method, to produce baked nonperishable sweet goods.

The mixing procedure includes the step of mixing the water with the water soluble ingredients of the formulation, particularly the sugar and sweeteners, until the water is substantially saturated. The admixture achieved contained a greater amount, by weight, of soluble solids than of water. The remaining ingredients which include wheat flour and shortening are then added to the above mentioned admixture and all the ingredients are mixed together only until uniform distribution of the ingredients throughout the dough is apparent. The dough is then formed into pieces as quickly as possible and is baked.

Dissolving the sugars and other water soluble ingredients in the water of the formulation before mixing in the protein ingredients causes the water to be captured by the water soluble ingredients and therefore become relatively unavailable for absorption or adsorption by the protein ingredients. The short time which the protein ingredients are mixed with the water admixture minimizes the amount of available water which is captured by the protein ingredients.

By keeping the majority of the water away from the protein ingredients, the process of the present invention produces baked goods of improved quality at all protein levels by promoting the development of a sugar based structure within the baked pieces.

At conventional protein levels the increase in sugar structure produces baked pieces which have a unique and somewhat crystalline open texture which readily dissolves in the mouth and contributes to an increased sensation of sweetness without any increase in the level of sweeteners used. The flavor impact of sweet ingredients, such as honey, is also heightened thus reducing the level required in a formulation. The sweet goods produced by this process are more open in texture, more tender and sweeter than baked goods of the same formulation which are prepared in the conventional manner.

In protein fortified baked goods produced by the conventional mixing procedure, the high protein ingredients inhibit the development of a sugar structure and therefore a dense and hard baked piece results. The process of the present invention produces a sugar structure in protein fortified sweet goods which is comparable to the sugar structure present in conventional low protein sweet goods, therefore, the baked high protein pieces made according to the present invention are very similar to conventional sweet goods in eating quality.

In mixing high protein formulations, a further safeguard can be taken to keep the high protein ingredients from imbibing significant quantities of water. The high protein ingredients can be shielded temporarily from the water admixture by interposing either flour or shortening between the water admixture and the high protein ingredients in the order of ingredient addition.

This invention can be used to produce nonperishable sweet goods which include cookies and graham crackers. Nonperishable sweet goods are distinguished from crackers in that such sweet goods contain high levels of both sugar and shortening while crackers have lower levels of sugar and shortening. Graham crackers have a high sugar and shortening content and are in that respect closer to being cookies than crackers. Crackers rely almost exclusively on the development of a gluten structure in the dough to bind the pieces together. Cookies on the other hand rely about equally upon carmelization of sugar and the development of a gluten structure to bind the pieces together. The presence of high amounts of sugar and shortening in a dough (such as a cookie dough) inhibits the development of an extensive gluten structure and the sugar becomes an important binding medium. Although graham crackers have the same sugar and shortening content as many cookies, the procedure normally used to form the graham cracker dough is designed to develop a gluten structure in spite of the presence of the shortening and sugar. In this procedure the dough is mixed "hot and long" that is, very hot water is used to raise the temperature of the dough to at least 110° F. and the final mix is long. The dough is then let lay for a substantial time. The high dough temperature, the long mix and the lay time all work toward directing the water away from the sugar and into flour in the dough. In the present invention graham crackers doughs are preferably formed by the same procedure that is used to form cookie doughs.

Various types of nonperishable sweet goods doughs can be prepared by the mixing procedures of the present invention. These various dough types include those which are commonly formed into product pieces by sheeting and cutting, by use of a rotary die, and by extrusion. One type of dough which cannot be formed by the procedures of the present invention is a laminated dough which is laminated by standard methods. Because of the low degree of gluten development in the doughs of the present invention, they do not have sufficient strength to support themselves during lamination.

DESCRIPTION OF THE PREFERRED EMBODIMENTS

The mixing procedure of the present invention is useful for forming baked nonperishable sweet goods doughs having a high sugar and shortening content together with a water content which is abnormally low for the amount of sugar and shortening present. In the first step of the mixing procedure, all, or the greater portion of the ingredient water, is mixed with all or most of the water soluble ingredients of the formulation.

The water soluble ingredients include sweeteners such as sugar, invert syrup, corn syrup, molasses, glucose, syrup, simple syrup, honey, etc., together with small amounts of salt and frequently a leavening agent such as sodium bicarbonate. Small quantities of flavorants, coloring agents and the like may also be added to the mixture. Each of the liquid sweeteners contain both sugar solids and an amount of water in which the sugar solids are dissolved. For example, invert syrups normally contains 70% sugar solids and 30% water, molasses contains about 65% sugar solids and about 24% water, and honey contains about 75% sugar solids and about 18% water. Sucrose may also be added in solution form which contains up to 70% sugar solids and 30% water.

In accordance with the present invention, the dough ingredients are such that the ratio of the total water to the sugar solids, by weight, is between about 1:1.4 and 1:2.6. The term total water as used throughout the specification and claims refers to the full amount of ingredient water (i.e. the water added) plus the water which is present in any syrups and solutions which are ingredients. The water present in the flour is not considered as part of the total water.

At least about 70% of the total sugar solids are sucrose with the remainder being reducing sugars, that is dextrose (also known as glucose) and levulose (also known as fructose). The reducing sugars are added for flavor or browning effect. Invert syrup, honey, corn syrup and glucose syrup contain reducing sugars. Sucrose is cane or beet sugar and is the sugar present in molasses. Sucrose can be present in the form of white sugar, brown sugar, molasses, or solutions of sucrose in water. The high sucrose content is necessary to provide the desired sugar structure in the finished product.

The temperature of the water together with the temperature of the shortening is used to control the temperature of the dough. The preferred dough temperature is between 75 and 97 degrees F. although higher and lower temperatures can be used. The water temperature at the beginning of the mixing step may vary between 40 degrees F. and the boiling point. The water and water soluble ingredients are mixed until a substantially saturated solution is produced. This requires about 6 minutes at water temperature between 70 and 95 degrees F. All, or substantially all, of the water is held by the sugar and other soluble ingredients reducing its availability to the protein ingredients in the subsequent step. A small amount of gluten development is desired in the finished dough to co-act with the sugar to produce a highly desirable texture in the baked product. Wheat gluten is more hydrophilic than sucrose and therefore is capable of drawing sufficient water away from the sucrose during the subsequent step to provide the desired gluten development.

After the water and water soluble ingredients are mixed, the temperature of the mixture may range from 40 degrees F. to about 160 degrees F. It is generally undesirable for the purposes of this invention to add flour to a solution which is above 160 degrees F. since high temperatures favor gluten development. It is preferred that the temperature of the solution not exceed 120 degrees when it is mixed with flour.

In the next step of the procedure, all of the remaining ingredients including the insoluble ingredients are added to the water mix substantially all at the same time and are mixed therewith without delay for a short period of time which is sufficient to achieve a visually apparent uniform distribution of the ingredients throughout the dough but which is insufficient to promote any substantial gluten development. Alternately, the dry ingredients may be preblended, and the shortening and the mix of water and water solubles can be added to the dry blend and mixed without delay. In a batch mixing operation, the remaining ingredients are dumped onto the water mix (in the mixer used to produce the water mix) while the mixer is stopped. They may be dumped one at a time or the dry materials may be preblended and then dumped with the shortening. Any liquids not included in the water mix (such as an ammonium bicarbonate solution for leavening purposes) are added during this step before or after the dry materials are added.

The insoluble ingredients include flours, any high protein ingredients included in the formulation, and possibly other minor and optional ingredients such as spices and colorings. The flour used can be wheat flour or a mixture of wheat flour and not more than about 20% of flours from other sources such as rye, oats, corn, rice, barley, etc. The wheat flour may contain up to about 50% whole wheat (graham) flour. The flour or flours constitute between about 45 percent and about 60 percent of the total weight of the dough when no high protein ingredients are included in the formulation. In protein fortified formulations, the percentage by weight of flour is decreased and constitutes as low as 18 percent, and preferably between 32 and 45 percent, of the dough weight where the formulations are designed to give maximum protein levels together with good eating qualities. Formulations fortified to a lesser extent would naturally have high percentages of flour.

As used herein the term high-protein ingredient refers to an ingredient which contains at least 20 percent protein. Examples of useful high protein ingredients are wheat gluten (about 70 to 80% protein), lactalbumin (about 73 to 82% protein), caseine and calcium caseinate (about 86 to 92% protein), egg albumin, corn gluten, winged beans, dehulled and defatted soybeans (about 50 to 53% protein), defatted sunflower flour (about 50 to 59% protein), ground nuts, cotton seed flour, soy concentrates and isolates, peanuts, sesame seeds, fish protein concentrate, etc.

The high protein ingredients can be added to sweet goods formulations as a substitution for a part of the flour, or the high protein ingredient can be added to the normal quantity of flour in the formulation and the sugar and shortening increased proportionately.

When high protein ingredients are used to provide maximum protein levels, they are preferably present in an amount between 13 and 43 percent by weight of the dough. The resultant high-protein baked sweet goods contain up to about 33 percent by weight of protein.

The shortening used may be any fat or oil suitable for this purpose from either animal or vegetable sources. Preferably the shortening is emulsified, for example, by the admixture of lecithin therewith. The shortening is preferably added in liquid form and can be heated to influence the temperature of the dough. The shortening is present in an amount between 6 and 16 percent of the total weight of the dough and the ratio of shortening to flour is between 0.12:1 and 0.45:1.

The amount of mixing to which the dough is subjected is only that which is necessary to achieve a uniform distribution of the ingredients through the dough. The test used to determine the uniformity of this distribution is a visual test, that is, the mixing is continued until the distribution of ingredients in the dough is such that it would appear to be uniform to the eye of one skilled in the art. Successful products have been made with mixing times of up to 7 minutes in a batch mixer run at a low speed of from 15 to 20 RPM. It is preferred that the dough be mixed for not more than about 4 minutes at slow speed.

After the mixing is completed, the dough is formed into pieces and baked in as short a period of time as is practical. A long lay time is to be avoided to prevent the flour and any high protein ingredients from drawing water away from the sugars. Transfer of the water from the sugars destroys the desired open and tender sugar structure in the finished product and hardens the dough to make machining difficult or impossible with standard equipment.

In forming protein fortified doughs by a batch mixing operation, it is preferred that the order of ingredient addition be such that either the flour or the shortening is interposed between the water admixture and the high protein ingredients. After the water and water soluble ingredients are mixed together in the batch mixer and the mixer is turned off, either the flour or the shortening is added to the water mix-before the high protein ingredient is dumped in.

The amount of flour exceeds the amount of ingredient water by between two and eight times on a weight basis. When the flour is dumped onto the water mix, the flour completely covers the water mix and therefore provides a shield to keep water away from the high protein ingredient which is added after the flour. When the shortening is added to the water mix first, it floats on top of the water mix and thus provides a shield between the water mix and the subsequently added ingredients. Preferably, the flour is added first and the shortening is added last because the shortening has a cleansing effect on the mixer when it is added last.

Alternately, the flour and the high protein ingredient is placed in a second mixer in a blended condition and the shortening is poured on top of these dry materials followed by the addition of the water mix. The shortening thus shields the dry materials from the water mix. In another alternative arrangement, the protein ingredient is added to a second mixer first and is covered by the flour, the shortening and water mix being added on top of the stratified dry materals.

The following examples further illustrate but do not limit the invention.

EXAMPLE 1

Three graham cracker doughs of identical formulation except for water content were prepared, one by the standard process and the other two by the process of the present invention. The doughs prepared were each divided into pieces and baked. The baked pieces were compared. The formulations of the three doughs were as follows:

| Ingredients | Trial #1 | Trial #2 | Trial #3 |
|---|---|---|---|
| White Flour | 63 lbs | 63 lbs | 63 lbs |

-continued

| Ingredients | Trial #1 | Trial #2 | Trial #3 |
|---|---|---|---|
| Graham Flour | 27 lbs | 27 lbs | 27 lbs |
| Shortening | 11 lbs | 11 lbs | 11 lbs |
| Sugar | 18 lbs | 18 lbs | 18 lbs |
| Invert | 6 lbs | 6 lbs | 6 lbs |
| Molasses | 8 lbs | 8 lbs | 8 lbs |
| Salt | 1 lb | 1 lb | 1 lb |
| Soda | 1 lb | 1 lb | 1 lb |
| Ammonia | 1 lb | 1 lb | 1 lb |
| Water | 19 lbs | 15 lbs | 15 lbs |

In the first trial, the conventional mixing procedure for graham crackers was used. The graham flour, shortening, sugar, invert, molasses, salt, and 13 lbs of water were mixed for 5 minutes. The water was at 210 degrees F. and the shortening was at 150 degrees F. The mixer was jacketed and the water in the jacket was maintained at 119 degrees F. After the 5 minute creaming mix, the mixer was stopped and the white flour, soda, and the ammonia mixed with 6 lbs of water were added. The mixer was turned on for 5 minutes, turned off, scraped down, and turned on again for 25 minutes. The total mixing time was 30 minutes at slow speed. The dough was allowed to lay for 2 hrs and then was formed into pieces and baked. The baked pieces had the characteristics of standard graham crackers.

In the second trial, the sugar, molasses, invert and salt were dissolved in 9 lbs of the water to form a solution. The water was 210 degrees F. when added to the other ingredients. This sugar solution was brought to 160 degrees F. and it was added together with the other ingredients to a mixer. The shortening was at 160 degrees F and the ammonia was dissolved in the remaining 6 lbs of water. The water in the mixer jacket was maintained at 119 degrees F. Immediately upon addition of the ingredients to the mixer, the mixer is turned on and the ingredients were mixed for 3½ minutes. The mixer was then scraped down followed by another 3½ minute mixing period. The dough, which had been mixed for a total of 7 minutes was immediately formed into product pieces and baked. The dough had a temperature of 113 degrees F. and was slightly soft, indicating that the water could have been further reduced. In comparison to conventional graham crackers, the crackers produced by this second trial were flatter, more tender, sweeter, more laminar, and more even celled.

In trial number 3, the same mixing procedure as that of the second trial was used with a lower dough temperature. The sweeteners and salt were dissolved in 9 lbs of 90 degree F. water. The sugar solution and the shortening were at room temperature when added to the mixer and the water in the jacket on the mixer was held at 95 degrees F. The resulting dough temperature was 86 degrees F. The dough was immediately formed into product pieces and baked. The resulting graham crackers were very similar to those produced by the second trial. They also were more tender, sweeter, more laminar, and more even celled than conventional graham crackers.

Using the figures given hereinbefore, the 6 lbs of invert contains about 4.2 lbs of sugar solids and 1.8 lbs of water. Likewise, the 8 lbs of molasses contains about 5.2 lbs of sugar solids and 1.9 lbs of water. Therefore, in Trial Number 1, the ratio of sugar solids to total water (ingredient water plus water contained in the syrups) was 1:1.2, total water content of the dough was 14.6%, and sugar solids accounted for 17.6% of the dough weight.

In Trials Number 2 and Number 3, the total water content of the dough was 12.4%, the ratio of sugar solids to total water was 1:1.46, and sugar solids accounted for 18.1% of the dough weight. In each of the trials, sucrose sugar accounted for about 85% of the sugar solids present.

The shortening accounted for 7.2% of the formulation of the first trial and 7.3% of the formulation of the second and third trials. The ratio of shortening to flour in each formulation was 0.12:1. In trial number 1, the flour accounts for 58% of the total weight of the dough, while in the second and third trials the flour accounted for 59.5% of the dough. In each of the trials, the flour contributed substantially all of the protein present, none of the flour being a high protein ingredient.

EXAMPLE 2

A high protein graham cracker type of sweet goods was prepared from the following ingredients:

| Ingredients | Weight | | Percent of Total |
|---|---|---|---|
| White flour | 65 lbs | | 27.88 |
| Graham flour | 35 lbs | | 15.01 |
| Sugar solids (74% sucrose, 26% reducing sugars) | 47 lbs | 3 oz. | 20.25 |
| Water in sugar syrup | 2 lbs | 13 oz. | 1.20 |
| Salt | 1 lb | 10 oz. | .70 |
| Soda | 1 lb | 14 oz. | .80 |
| ammonia bicarbonate | 1 lb | 10 oz. | .70 |
| lecithin | | 8 oz. | .21 |
| texturized soya | 11 lbs | | 4.72 |
| milk protein | 11 lbs | | 4.72 |
| fish protein concentrate | 8 lbs | | 3.43 |
| shortening | 16 lbs | 4 oz. | 6.97 |
| water | 30 lbs | | 12.86 |

The sugar ingredients, salt, soda and about 90% of the water were placed in an upright mixer and mixed for 6 minutes. All of the ingredients were dissolved, producing a solution which was about 96% saturated. The mixer was then stopped and the remaining ingredients were dumped into the mixer on top of each other. The flours were dumped first on top of the sugar solution followed by the high protein ingredients (the soya, milk protein and fish protein concentrate). The shortening has been mixed with the lecithin and is therefore emulsified. The shortening was added on top of the high protein ingredients and the ammonia bicarbonate dissolved in the remaining 10% of the water is added last. The mixer was then turned on and the ingredients were mixed for 3 minutes until uniform distribution of the ingredients was apparent from visual inspection. The dough temperature was between 95 and 97 degrees F.

The dough was sheeted, divided into pieces by a reciprocating cutter and baked. The time elapsed between the end of the final mixing operation and baking was less than 30 minutes.

In the dough, the ratio of total water (ingredient water plus solution water present in any sugar ingredient) to sugar solids was 1:1.44. The ratio of shortening to flour was 0.16 to 1. The high protein ingredients were present in the amount of 12.87 percent by weight. The total protein content of the finished product pieces was 18.6% by weight.

Although the protein content of this graham cracker type product is very high for baked goods, the water content of the dough was approximately equal to that of conventional graham crackers having conventional protein levels. The products produced in this example were comparable to conventional graham crackers in appearance and eating quality.

EXAMPLES 3, 4 and 5

Three protein fortified rotary formed sweet goods doughs were prepared from the following formulations:

| Ingredients | Example 3 | | | Example 4 | | | Example 5 | | |
|---|---|---|---|---|---|---|---|---|---|
| White flour | 65 | lbs | | 100 | lbs | | 100 | lbs | |
| Graham flour | 35 | lbs | | | | | | | |
| Sugar solids | 46 | lbs | 6 oz. | 46 | lbs | 6 oz. | 47 | lbs | 14 oz |
| | (75% sucrose) | | | (75% sucrose) | | | (83.5% sucrose) | | |
| Water in sugar syrup | 4 | lbs | 14 oz. | 4 | lbs | 14 oz. | 1 | lb | |
| salt | 1 | lb | 10 oz. | 1 | lb | 10 oz. | | | 9 oz. |
| leavening (chemical) | 3 | lb | 8 oz. | 1 | lb | 8 oz. | 2 | lbs | 11 oz. |
| lecithin | | | 8 oz. | | | 8 oz. | | | |
| texturized soya | 13 | lbs | 8 oz. | 13 | lbs | 8 oz. | 19 | lbs | 5 oz. |
| milk protein | 19 | lbs | 8 oz. | 19 | lbs | 1 oz. | 28 | lbs | 6 oz. |
| fish protein concentrate | 4 | lbs | 1 oz. | 4 | lbs | 8 oz. | 5 | lbs | 5 oz. |
| shortening | 16 | lbs | 4 oz. | 16 | lbs | 4 oz. | 44 | lbs | 7 oz. |
| water | 15 | lbs | | 13 | lbs | | 17 | lbs | 8 oz. |
| cocoa powder | — | | | — | | | 8 | lbs. | |
| flavoring | | | 1 oz. | | | 1 oz. | | | 2 oz. |
| cornstarch | | | | | | | 11 | lbs. | 2 oz. |

The doughs were mixed using the procedure described in detail in connection with Example 2. In each case, the water mix step produced a slurry in which undissolved materials were dispersed in a saturated solution. The temperature of the dough was between 75 and 78 degrees F. After mixing, the doughs were formed into product pieces by means of a rotary die and were baked, the time lapse from the completion of mixing to baking being kept to a minimum and not exceeding about 30 minutes. The cookies formed had an overall quality in taste and texture comparable to commercial sweet goods of conventional protein levels.

The quantities of the major ingredients as a percentage of the total dough weight was as follows:

| Ingredients | Example 3 | Example 4 | Example 5 |
|---|---|---|---|
| Wheat flour | 44.40% | 44.79% | 34.89% |
| Total high protein ingredients | 16.48% | 16.50% | 18.49% |
| shortening | 7.22% | 7.28% | 15.50% |
| Total water | 8.82% | 8.01% | 6.24% |
| total sugar solids | 20.59% | 20.9% | 16.9% |

The ratio of certain ingredients to other ingredients in the doughs were as follows:

| Relationship | Example 3 | Example 4 | Example 5 |
|---|---|---|---|
| shortening to flour | 0.16 to 1 | 0.16 to 1 | 0.44 to 1 |
| total water to sugar solids | 1 to 2.33 | 1 to 2.59 | 1 to 2.59 |

The protein levels of the baked products of these three examples were as follows:

| Example 3 | Example 4 | Example 5 |
|---|---|---|
| 18.6% | 19.1% | 20.2% |

EXAMPLE 6

Another protein fortified rotary piece was prepared from the following formulation:

| Ingredients | Weight | | |
|---|---|---|---|
| White flour | 100 | lbs | |
| Sugar solids | 52 | lbs | (93% sucrose) |
| Water in sugar syrup | 1 | lb | 8 oz. |
| Salt | 1 | lb | 2 oz. |
| Soda | | | 12.5 oz. |
| Ammonium bicarbonate | 1 | lb | 14 oz. |
| milk protein | 45 | lbs | 13 oz. |
| soya flour | 25 | lbs | |
| fish protein concentrate | 5 | lbs | 5 oz. |
| shortening | 40 | lbs | |
| emulsifier | | | 5 oz. |
| flavoring | | | 5 oz. |
| water | 35 | lbs | |

The dough was mixed using the procedure described in connection with Example 2 and dough pieces were formed by means of a rotary die and were baked within 30 minutes of the completion of the mixing of the dough. The cookies formed had an overall quality in taste and texture comparable to commercial cookies of this type having conventional protein levels.

The quantities of major ingredients as a percentage of the total dough weight was as follows:

| Ingredients | Percentage |
|---|---|
| Wheat flour | 32.35% |
| High protein ingredients | 24.62% |
| Shortening | 12.94% |
| Total water | 11.81% |
| Total sugar solids | 16.8% |

The ratio of certain ingredients to other ingredients in the dough were as follows:

| Relationship | Ratio |
|---|---|
| Shortening to flour (wheat) | 0.40 to 1 |
| Total water to sugar solids | 1 to 1.42 |

The protein level in the baked cookies was 22.7%.

EXAMPLE 7

A protein fortified extruded bar piece was prepared from the following formulation:

| Ingredients | Weight | | | Percentage |
|---|---|---|---|---|
| white flour | 100 | lbs | | 44.21 |
| sugar solids | 46 | lbs | 6 oz. | 20.51 |
| | (75% sucrose) | | | |
| water in sugar syrup | 4 | lbs. | 14 oz. | 2.16 |
| salt | 1 | lb. | 10 oz. | .72 |
| leavening agents | 3 | lbs | 8 oz. | 1.55 |
| lecithin | | | 8 oz. | .22 |
| texturized soya | 11 | lbs | | 4.86 |
| milk protein | 19 | lbs | | 8.40 |
| shortening | 16 | lbs | 4 oz. | 7.18 |
| flavoring | | | 1 oz. | .03 |

| Ingredients | Weight | Percentage |
|---|---|---|
| water | 23 lbs | 10.17 |

The dough was prepared by using the procedure described in connection with Example 2. The temperature of the dough was 86 degrees F.

It can be seen from above that the total water content is 12.33% of the dough weight. The ratio of shortening to flour is 0.16 to 1 and the ratio of total water to sugar solids is 1 to 1.67. The protein level of the baked sweet goods was 17.0%.

EXAMPLE 8

A protein fortified cookie dough was formed from the following formulation:

| Ingredient | Weight | |
|---|---|---|
| white flour | 50 lbs | |
| graham flour | 50 lbs | |
| soya grits | 125 lbs | |
| soya flour | 25 lbs | |
| corn flour | 3 lbs | |
| shortening | 32 lbs | 8 oz. |
| lecithin | 1 lb | 14 oz. |
| sugar solids | 107 lbs | (100% sucrose) |
| milk protein | 52 lbs | 8 oz. |
| egg albumin | 23 lbs | 2 oz. |
| dry yeast | 10 lbs | 5 oz. |
| salt | 1 lb | 14 oz. |
| leavening agents | 15 lbs | 6.5 oz. |
| spices | 2 lbs | 8 oz. |
| flavors (liquid) | | 10 oz. |
| dry coloring | 2 lbs | 8 oz. |
| Vitamin blend | | 15 oz. |
| mineral blend | | 11.5 oz. |
| water | 50 lbs. | |

The following ingredients were blended for about 6 minutes in an upright mixer: soya grits, soya flour, graham flour, white flour, corn flour, milk protein, dry yeast, spice, egg albumin, and dry coloring.

The following ingredients were mixed for 10 minutes in a Norman mixer: water at 60 degrees F., sugar solids, liquid flavors, salt, leavening agents, vitamin blend, and mineral blend.

The shortening was heated to 140 degrees F. and the lecithin was dissolved therein. The emulsified shortening was then poured into the upright mixer on top of the dry blend. The water mix was then poured into the upright mixer on top of the shortening and the mixer was turned on at slow speed (15-20 RPM) for 4 minutes. The dough temperature was between 84 and 86 degrees F. The dough was formed into pieces by means of a rotary die within 30 minutes of the completion of mixing.

The quantity of major ingredients as a percentage of the total dough weight was as follows:

| Ingredient | Percentage |
|---|---|
| Wheat flour | 18% |
| High Protein ingredients | 42.5% |
| Shortening | 5.8% |
| Total water | 9.0% |
| total sugar solids | 19.3% |

The ratio of shortening to flour (by weight) in the dough was 0.325 to 1. The ratio of total water to sugar solids (by weight) in the dough was 1 to 2.15.

The protein level of the baked cookies was 33.2% by weight.

The cookies produced were similar to conventional cookies in texture, tenderness and eating quality.

The identical formulation except for water content was formed into a dough using the conventional method of preparing cookie doughs (creaming the sugar, shortening and water and mixing the remaining ingredients for about 10 minutes). This dough required 180 lbs of water and the resulting cookies were dense and hard, lacking in desirable eating qualities. The use of the mixing procedure according to the present invention enabled the water to be reduced to 28% of the level required with conventional mixing procedures.

It will be seen from the foregoing that the present invention fulfills all of the objects of the invention stated hereinbefore.

We claim:

1. A process for forming a high protein content dough which can be used for producing improved nonperishable baked sweet goods having an enhanced sugar structure development which consists essentially of:
   (a) mixing water with a quantity of sugar containing sugar solids comprising between 16 and 21 percent by weight of said dough to be formed to substantially saturate the water, at least about 70% of the sugar being sucrose; and
   (b) forming a dough by combining the water mixture of step (a) at a temperature of from 40° to about 120° F. with shortening, flour and at least one high protein ingredient, each of said high protein ingredients containing at least 20% protein, and mixing the dough at a temperature between 75° F. and 97° F. and only until uniform distribution of the ingredients throughout the dough is visually apparent, the ratio of total water to sugar solids in said dough being between about 1 to 1.4 and about 1 to 2.6, the total water content in said dough being between about 6 and about 14 percent by weight, the amount of said at least one high protein ingredient being between 13 and 43 percent by weight of said dough to produce baked goods having a protein content of up to about 33 percent, said mixing of the dough being for a time and at a temperature which are insufficient to promote any substantial gluten development, and then forming said dough into pieces, the time lapse between completion of said mixing to baking of said pieces not exceeding 30 minutes and being sufficiently short so as to promote the development of a sugar based structure in said nonperishable baked sweet goods.

2. The process of claim 1 wherein the flour which is combined with the water mixture in step (b) includes wheat flour in an amount of at least about 18 percent by weight of said dough, said shortening being present in an amount such that the ratio of shortening to flour by weight is between about 0.14 to 1 and 0.45 to 1.

3. The process according to claim 2 wherein the ingredients combined in step (a) are mixed for a period of about 6 minutes.

4. The process of claim 1 wherein said water mixture, flour, shortening, and said at least one high protein ingredient are combined in an order such that either the shortening or flour is initially interposed between the at least one high protein ingredient and the water mixture to act as a temporary barrier between said water mixture and said at least one high protein ingredient.

5. The process of claim 4 wherein said water mixture and shortening are added to said flour and at least one high protein ingredient, said shortening being added prior to said water mixture to act as said temporary barrier.

6. The process of claim 1 wherein said flour, shortening and at least one high protein ingredient are added to said water mixture, said at least one high protein ingredient being added after said flour or said shortening to provide a temporary barrier between said water mixture and said at least one high protein ingredient.

7. The process according to claim 1 wherein in step (a) at least a major portion of the water of said dough is mixed with the sugar of said dough in a mixer, the mixer being turned off after the water mixture is prepared, and wherein in step (b) said combining is by adding the at least one high protein ingredient, flour, and shortening on top of the water mixture while the mixer is turned off, and wherein said flour is dumped onto the water mixture first, the at least one high protein ingredient is added to the mixer after the flour, and the shortening is added after the at least one high protein ingredient.

8. The process according to claim 7 wherein the ingredients are mixed for a period of time not exceeding about 4 minutes.

9. The process according to claim 1 wherein the ingredients combined in step (b) are mixed for a period of time not exceeding about 7 minutes.

10. The process of claim 1 wherein said at least one high protein ingredient is selected from the group consisting of wheat gluten, lactalbumin, caseine, calcium caseinate, egg albumin, corn gluten, winged beans, dehulled and defatted soy beans, defatted sunflower flower, nuts, cotton seed flour, soy concentrates and isolates, sesame seeds, and fish protein concentrates.

11. The process of claim 1 wherein said at least one high protein ingredient is dehulled and defatted soy beans, or a soy concentrate or isolate.

12. The process of claim 1 wherein said at least one high protein ingredient is a mixture of high protein ingredients each having a protein content of at least 20%.

13. In a process for preparing nonperishable sweet goods comprising mixing together sugar, shortening and water to form a cream mass and then mixing in protein ingredients comprising flour to form a dough, the improvement consisting essentially of:

(a) mixing water with a quantity of sugar containing sugar solids comprising between 16 and 21 percent by weight of said dough to be formed to substantially saturate the water, at least about 70% of the sugar being sucrose;

(b) forming a dough by combining the water mixture of step (a) at a temperature of from 40° F. to about 120° F. with shortening, flour and at least one high protein ingredient, each of said high protein ingredients containing at least 20% protein, and mixing the dough at a temperature between 75° F. and 97° F. and only until uniform distribution of the ingredients throughout the dough is visually apparent, the ratio of total water to sugar solids in said dough being between about 1 to 1.4 and about 1 to 2.6, the total water content in said dough being between about 6 and about 14 percent by weight, the amount of said high protein ingredient being between 13 and 43 percent by weight of said dough to produce baked goods having a protein content of up to about 33 percent, the amount of shortening being between 6% and 16% of the dough, the amount of flour being at least 18% by weight of the dough, the ratio of shortening to flour being between 0.12:1 and 0.45:1, said mixing of the dough gluten being for a time and at a temperature which are insufficient to promote any substantial gluten development;

(c) forming said dough into pieces; and (d) baking said pieces to develop a sugar structure; the time lapse between completion of said mixing to baking of said pieces not exceeding 30 minutes.

14. A process as claimed in claim 13 wherein said at least one high protein ingredient is a mixture of dehulled and defatted soy beans, and at least one other high protein ingredient each having a protein content of at least 20%.

15. A process as claimed in claim 14 wherein said at least one other high protein ingredient is lactalbumin.

* * * * *